United States Patent
Nolte

(10) Patent No.: US 7,203,316 B1
(45) Date of Patent: Apr. 10, 2007

(54) SIGNING AND SIGNATURE AUTHENTICATION OF MESSAGES

(75) Inventor: Michael Nolte, Brakel (DE)

(73) Assignee: Wincor Nixdorf International GmbH, Paderborn (DE)

(*) Notice: Subject to any disclaimer, the term of this patent is extended or adjusted under 35 U.S.C. 154(b) by 0 days.

(21) Appl. No.: 09/720,353

(22) PCT Filed: Apr. 7, 2000

(86) PCT No.: PCT/DE00/01086

§ 371 (c)(1),
(2), (4) Date: Dec. 21, 2000

(87) PCT Pub. No.: WO00/67422

PCT Pub. Date: Nov. 9, 2000

(30) Foreign Application Priority Data

Apr. 30, 1999 (DE) .............................. 199 19 909

(51) Int. Cl.
*H04L 9/00* (2006.01)
(52) U.S. Cl. ..................................................... 380/278
(58) Field of Classification Search ........ 713/152–153, 713/171, 181, 1; 380/2, 284, 279, 277–9, 380/281, 260, 262
See application file for complete search history.

(56) References Cited

U.S. PATENT DOCUMENTS

| | | | | |
|---|---|---|---|---|
| 4,549,075 A | | 10/1985 | Saada et al. ................. | 235/380 |
| 5,608,800 A | * | 3/1997 | Hoffmann et al. .......... | 713/181 |
| 5,613,012 A | * | 3/1997 | Hoffman et al. ............ | 382/115 |
| 5,754,656 A | | 5/1998 | Nishioka et al. ............. | 380/25 |
| 5,768,385 A | | 6/1998 | Simon .......................... | 380/24 |
| 6,009,401 A | * | 12/1999 | Horstmann ..................... | 705/1 |
| 6,496,928 B1 | * | 12/2002 | Deo et al. .................... | 713/153 |

FOREIGN PATENT DOCUMENTS

| | | |
|---|---|---|
| DE | 19718547 A2 | 11/1998 |
| EP | 0077238 A1 | 4/1983 |
| EP | 0804003 A2 | 10/1997 |
| WO | WO93/21711 | 10/1993 |

* cited by examiner

*Primary Examiner*—Gilberto Barrón, Jr.
*Assistant Examiner*—Peter Poltorak
(74) *Attorney, Agent, or Firm*—Michaud-Duffy Group LLP

(57) ABSTRACT

Method for signing a message, in which a control center and the receiver share a permanent, main key. The control center produces a sequence number, and a signing key from this by means of a one-time function. Both are provided in secure form to the sender. The sender uses the signing key to form a signature for the message, forms a data set, and sends the data set containing the signature, the sequence number and the message, to the receiver. The receiver uses a one-way function, main key and sequence number to form a check key, and thus checks the signature on the message.

16 Claims, 1 Drawing Sheet

SIGNING AND SIGNATURE AUTHENTICATION OF MESSAGES

FIELD OF THE INVENTION

The invention relates to the signing and signature checking of messages using secret keys.

BACKGROUND OF THE INVENTION

In order to provide protection against corruption of messages, it is known for symmetrical cryptography to be used to form a signature by means of which the receiver can check, with very high probability, whether the message has been transmitted without corruption and originates from the predetermined sender. However, one precondition is that the sender and receiver have a common, secret key, which must be stored in secure form. One such method is described, for example, in U.S. Pat. No. 4,549,075.

Symmetrical cryptography, in particular the DES method, is frequently used in smart cards, because this method can be programmed very efficiently. The smart cards furthermore have a read only memory in which a main key is stored in secure and secret form, and this main key is also stored in secure form in a control center.

If it is now intended to send a message, protected against corruption, from a sender to the receiver, in this case the smart card, then, until now, the sender has had to have the message signed by the control center, since the control center cannot provide the sender with the secret main key without weakening the entire system. Furthermore, measures are required to ensure that the message is protected against corruption and imitation of a legitimate sender during transmission from the sender to the main center.

The object of the invention is thus to specify a method for corruption protection of messages by means of a signature which can be formed by a sender and can be sent to a receiver without the sender having the secret main key, which is shared by the receiver and a control center, or without the message having to be sent in advance to the control center, for signature formation.

SUMMARY OF THE INVENTION

The invention uses a method in which the control center forms signing keys in advance, and provides them to the sender. As is described in more detail in the exemplary embodiments, the receiver can model the signing key, and can thus check the message.

This relates to a method for signing a message, in which a control center and the receiver have a permanent, common main key. The control center produces a sequence number in advance, and produces a signing key from this by means of a one-time function. Both are provided to the sender, in secure form. The sender uses the signing key to form a signature for the message, and sends this signature with the sequence number and the message to the receiver. The receiver uses a one-time function, main key and sequence number to form a check key, and thus checks the signature on the message.

Further features and advantages of the invention result from the following description, which explains the invention with reference to an exemplary embodiment and in conjunction with the attached drawing.

BRIEF DESCRIPTION OF THE DRAWING

In the figures.

DETAILED DESCRIPTION OF THE PREFERRED EMBODIMENTS

Figure 1:
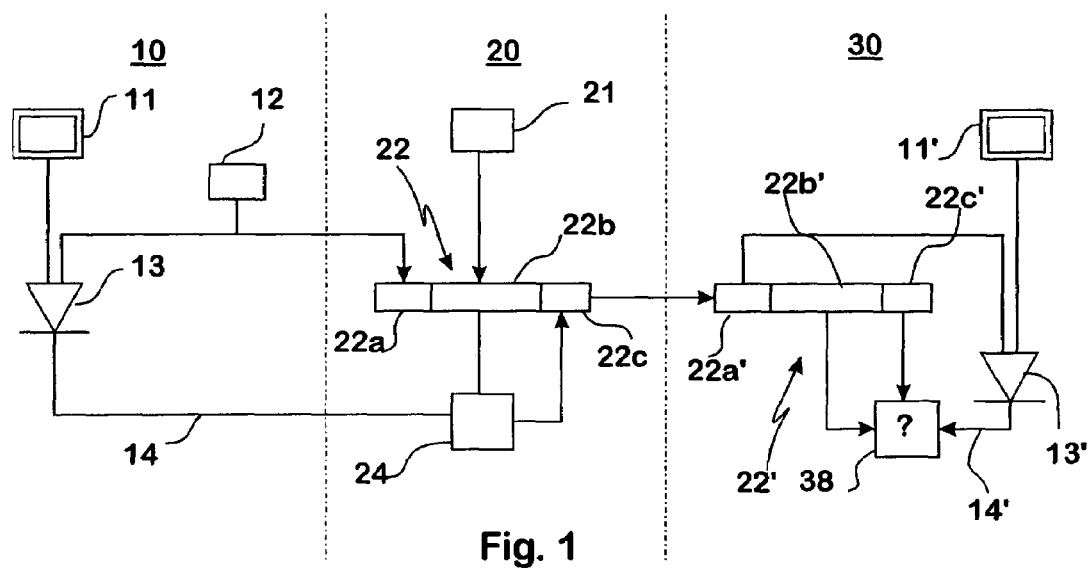
FIG. 1 shows a diagram in which the data flow is symbolized, with the components involved.

FIG. 1 indicates the three parties involved in the method, namely the control center 10, the sender 20 and the receiver 30, separated by dashed-dotted lines.

The control center 10 contains a secure memory 11 for a secret key which is otherwise used, for example, in a symmetrical cryptographic encryption or signing method. The receiver 30 contains a corresponding memory 11', which contains the same key. This key is written to the control center during initialization, for example, if the receiver 30 is a smart card. Otherwise, key distribution methods known from cryptography can be used. In this case, the key is stored only once or at very long time intervals; the storage can be regarded as being permanent for the method according to the invention.

The control center 10 furthermore contains a sequence generator 12. This provides a series of numbers, which each differ. In the simplest case, this is a sequential number. However, it is better to use a known pseudo-random number generator, for example using the modulo method. If the parameters are chosen correctly, these pseudo-random number generators produce a sequence of new numbers in each case until the cycle which is governed by the modulus has been run through. Decreasing numbers or numbers with a step interval greater than unity can also be used. It is likewise possible to use the date and time as a unique sequence number, possibly as the number of seconds since an appointed start.

The control center thus produces one or more sequence numbers 12. A one-time encrypter 13 uses the main key to form a signing key 14 from such a sequence number 12. This is most easily done by the sequence number 12 being encrypted by means of the main key. In this case, a short sequence number is filled out by means of further data to the block length of the encryption method. Although binary zeros can be used for this purpose, it is better to use a function of the sequence number, for example its square. It is also possible to use a constant text, which does not consist of binary zeros and is kept confidential. Since the block size is generally in the same order of magnitude as the key length, it is still possible to use the result as a key; if necessary, bits must be added or the number of bits reduced by convolution.

The essential characteristic of the one-time encrypter is that it is virtually impossible to deduce the main key. Although the method just described is not a one-time encryption since, for example, the receiver could form the sequence number from the signing key by decryption, the "one-time" functionality is the main feature.

Other one-time functions are thus used in other embodiments which link the main key and the sequence number in a reproducible manner to form a signing key without anyone who does not have the main key relating to a given sequence number being able to form a valid signing key, or vice versa, or being able to determine the main key from the signing key and the sequence number. Such methods are generally referred to as "message authentication codes" (MAC). One such method may be formed, in particular, by applying any desired cryptographically secure one-time function to a combination of a main key and sequence number. A concatenation, exclusive-OR, multiplication with or without modulo formation or addition, etc., may be used as the combination.

The control center 10 thus provides one or more pairs of sequence numbers 12, and signing keys 14 produced from them. This can be done, for example, by printing out on security paper, by storage in a further smart card or by some other secure data transmission. These pairs are provided to the sender 20 in advance, who must store them in a secure and confidential manner.

The sender 20 who wishes to send a message 21 to the receiver 30 takes a pair of sequence numbers 12 and signing keys 14 and uses the signer 24 to determine the signature for the message 21. The DES method, for example in accordance with ANSI X9.9, is preferably also used in this case. Alternatively, a signature can be produced by a combination of a cryptographic hash function and a message authentication code. Methods relating to this have been described frequently and comprehensively in the cryptographic literature.

The sender then forms a data set 22, which contains three fields with the sequence number 22a, the message 22b and the signature 22c. The signing key 14 which has just been used is deleted.

The data set 22 is now transmitted to the receiver 30, which thus receives a data set 22' which once again contains three fields, which are regarded as the sequence number 22a', the message 22b' and the signature 22c'. Normally, this data set has already been protected against transmission errors by other security or plausibility mechanisms.

The receiver extracts the sequence number 22a' from the received data set 22', and passes this together with the main key 11' to one-time encryption 13' which, in the same way as the one-time encryption 13, is located in the control center 10 and is functionally identical to it. A check key 14' is produced at the output of the one-time function. If the sequence number has been transmitted correctly, this check key 14' is identical to the signing key 14 which the sender 20 has used. The check key 14' is passed to a signature checker 38 together with the message 22b' which has arrived and the signature 22c' which has arrived. If all three match one another, an enable signal for further use of the message is produced at the output of the signature checker 38. At the end of the check, the check key 14' is destroyed, irrespective of the result.

In one development of the invention, the receiver maintains a list of already used sequence numbers, and rejects messages with already used sequence numbers. This provides additional security against misuse.

Since the sequence number is preferably produced by a deterministic generator, there is no need to transmit the sequence number. Since the common main key has to be transmitted in a secure environment to the receiver in any case, the initial value of the generator can be transmitted at the same time. Whenever a message is received, the receiver produces a new value for the sequence number, and thus forms the check key 14' without the sequence number having to be transmitted as well. In order to be robust against double transmissions and lost messages, one of the last and following sequence numbers is expediently also then used. In this case as well, the control center can provide the sender with a number of signing keys 14, which the sender should then use in the predetermined sequence.

One possible application of the invention is in the field of automatic cash dispensers. The control center is in this case the bank control center, which uses a main key for checking the PIN and supplies personalized checking modules to the manufacturer of automatic cash dispensers in the control center. The sender may be a manufacturer or a local bank organization which, for example, wishes to load a currency conversion rate or a discount rate into the automatic cash dispensers; however, such organizations cannot introduce their own secret key into the cash dispenser, nor do they wish to install their own security module.

If the receiver does not contain a non-volatile memory, the receiver can also produce the sequence numbers from the start and test the signature with each of them. The loss of security in this case is low, but this does not provide any protection against double use.

The invention claimed is:

1. A device for signing a message which is sent from a sender to a receiver comprising:

a control center having a first memory, the control center including one input of a first one-time encrypter being connected to the first memory of the control center and another input being connected to a generator for a sequence number;

a receiver having a second memory, each of the control center and the receiver storing a secret, common main key, the receiver comprising a signature checker having inputs connected to a message and to a signature of a data message block which has arrived via a secured transmission;

a sender capable of receiving at least one pair of a signing key and the selected sequence number from the control center, an output of the first one-time encrypter being connected to the sender via the secured transmission, the sender comprising, a signature generator provided in the sender, and having inputs connected to the output of the first one-time encrypter and to the message to be signed, and an output of the signature generator providing a signature and being connected to a device which assembles at least the signature and the message to form the data message block and whose output is connected to the receiver via the secured transmission;

a second one-time encrypter provided in the receiver, the second one-time encrypter having inputs connected to the second memory of the receiver for the secret main key and to means for determining a sequence number for the received data message block, the second one-time encrypter forming a check key;

the signature checker being configured to receive an output of the second one-time encrypter;

the check key and the determined sequence number being used to form a calculated signature for comparison to the signature of the data message block; and wherein the control center, the receiver, and the sender are individual and separate one from the other.

2. The device as defined in claim 1, wherein the generator to produce a sequence number uses a deterministic method to produce one or more sequence numbers that correspond to the same number of check keys.

3. A method for signing a message from a sender and for checking a signature at a receiver, the method comprising the steps of:

storing, in a control center and a receiver, a shared main key;

causing the control center to produce one or more sequence numbers;

using a selected one of the sequence numbers and the shared main key to create a signing key by means of a one-time encryption;

providing at least one pair of the signing key and the selected sequence number to the sender via a secure transmission;

the sender using the at least one pair of the signing key and the selected sequence number to form a signature for a message;

the sender forming a data set;

the sender sending the message to the receiver via the data set containing at least the message and the signature;

determining, at the receiver, a sequence number for the received data set passing the determined sequence number and the shared main key through a one-time encryption to produce a check key;

using the check key and the determined sequence number to form a calculated signature; and comparing the calculated signature to the received signature to verify the received message;

wherein the control center, the receiver, and the sender are individual and separate one from the other.

4. The method as defined in claim 3, wherein the sequence number is transmitted together with the signing key from the control center to the sender, and is transmitted from the sender via the data set to the receiver.

5. The method as defined in claim 4, wherein the selected sequence number is transmitted via the data set from the sender to the receiver, the step of determining a sequence number includes extracting the sequence number from the received data set.

6. The method as defined in claim 3, wherein the sequence numbers are used to produce signing keys in the control center and corresponding checking keys in the receiver.

7. The method as defined in claim 3, wherein the sequence numbers are used to produce signing keys used in the control center and corresponding check keys are used in the receiver wherein the sequence number is transmitted via the data set to the receiver.

8. The method as defined in claim 3, wherein the sequence number is produced by a pseudo-random number generator.

9. The method as defined in claim 8, the step of determining a sequence number includes:

storing, at the receiver, an initial value for the pseudo-random number generator; and receiving the data set at the receiver, the receiver producing a new value of the sequence number.

10. The method as defined in claim 3, wherein the encryption of the sequence number by means of the main key is used as the one-time encryption.

11. The method as defined in claim 3, wherein the control center produces a number of pairs of signing keys and sequence numbers, and transmits the signing keys to the sender, either separately or together as pairs with the associated sequence numbers.

12. The method as defined in claim 3, wherein the receiver maintains a list of already used sequence numbers, and rejects already used sequence numbers.

13. The method as defined in claim 3, wherein the sequence numbers are comprised of one of decreasing numbers, numbers with a step interval greater than unity and numbers representing a date and time, the time including a number of seconds from an appointed start time.

14. The method as defined in claim 3, wherein the secure transmission of the signing key and the selected sequence number between the control center and the sender includes one of printing on security paper and storage in a smart card.

15. The method as defined in claim 3, wherein the calculated signature and the received signature are the same when the check key and the signing key are the same.

16. The method as defined in claim 3, wherein the control center is comprised of a control center for a financial institution, the sender is comprised of one of a manufacturer of an automated cash dispensing mechanism and a local branch of the financial institution, and the receiver is comprised of an automatic cash dispensing mechanism.

* * * * *